(12) United States Patent
Berhan

(10) Patent No.: US 8,093,770 B1
(45) Date of Patent: Jan. 10, 2012

(54) ELECTRIC MOTOR WITH LIQUID-COOLED END WINDINGS

(75) Inventor: Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/882,678

(22) Filed: Sep. 15, 2010

(51) Int. Cl.
*H02K 9/00* (2006.01)
*H02K 9/08* (2006.01)

(52) U.S. Cl. ............. 310/54; 310/52; 310/57; 310/58
(58) Field of Classification Search .......... 310/52–58, 310/89, 260, 268
See application file for complete search history.

(56) References Cited

U.S. PATENT DOCUMENTS

| | | | | |
|---|---|---|---|---|
| 2,148,339 | A * | 2/1939 | Cryan | 242/171 |
| 2,537,723 | A * | 1/1951 | Ward | 381/432 |
| 3,060,335 | A * | 10/1962 | Greenwald | 310/54 |
| 3,353,041 | A * | 11/1967 | Little | 310/43 |
| 4,207,969 | A * | 6/1980 | Howell | 188/71.6 |
| 5,067,046 | A * | 11/1991 | Elton et al. | 361/220 |
| 5,293,089 | A | 3/1994 | Frister | |
| 5,313,698 | A | 5/1994 | Schaeftlmeier et al. | |
| 5,767,600 | A * | 6/1998 | Whiteley | 310/184 |
| 5,783,888 | A | 7/1998 | Yamano | |
| 6,515,383 | B1 | 2/2003 | Ognibene et al. | |
| 7,514,826 | B2 | 4/2009 | Wakita | |
| 2002/0153784 | A1 * | 10/2002 | Kanppenberger | 310/52 |
| 2002/0180284 | A1 * | 12/2002 | LeFlem et al. | 310/54 |
| 2007/0216236 | A1 | 9/2007 | Ward | |
| 2008/0023177 | A1 * | 1/2008 | Hassett et al. | 165/104.33 |

FOREIGN PATENT DOCUMENTS

JP  54126903  A  * 10/1979
SU  1742871  A1 *  6/1992

* cited by examiner

*Primary Examiner* — Quyen Leung
*Assistant Examiner* — Jose Gonzalez Quinones
(74) *Attorney, Agent, or Firm* — David B. Kelley; Brooks Kushman P.C.

(57) ABSTRACT

Cooling of the end windings on a stator of the electric motor can be made more uniform if a physically-compliant, thermally-conductive cap is placed over the end windings. In one embodiment, a liquid coolant is sprayed on the outside of the cap. The cap serves to make the temperature more uniform in the end windings. In an alternative embodiment, a cover is placed over the cap with a coolant jacket formed between the cap and the cover. A coolant, such as transmission fluid or engine coolant, can be circulated in the coolant jacket.

14 Claims, 5 Drawing Sheets

ELECTRIC MOTOR WITH LIQUID-COOLED END WINDINGS

BACKGROUND

1. Technical Field

The present disclosure relates to cooling of electric motors.

2. Background Art

To obtain good performance and long life of an electric motor, cooling is essential. In some motors, a fluid is sprayed onto winding ends of the coil to provide a higher heat transfer rate than possible with forced air convection. It is important to attempt to uniformly spray the end windings. In one example shown, oil is sprayed from the center, i.e., from a center-mounted rotor that has an oil supply, toward the windings. A temperature differential between the inner side of the end windings and an outer side of the end windings limits the maximum performance and causes differential expansion and stresses thereby limiting the life of the motor. In one alternative, a heat sink is placed over the ends of the end windings to even out the temperature variation. However, the outer surface of the end windings is variable and highly convoluted as it is made of many wires placed next to each other. Thus, it is very difficult to obtain good contact between the heat sink and the windings and the overall heat transfer is much less than directly spraying the inner side of the end of the windings. The heat transfer rate between two surfaces can vary by orders of magnitude if even a slight air gap exists between the two. It is known to pot the windings in epoxy to obtain good contact. However, even epoxy that includes solids to enhance heat transfer may fail to be sufficiently thermally conductive.

SUMMARY

An electric motor is disclosed that has a stator that is generally shaped as a hollow cylinder having longitudinal projections extending inwardly from an inner surface of the stator with slots defined between the projections, a plurality of wire windings disposed in the slots, end windings proximate both ends of the stator, and a physically-compliant, thermally conductive cap placed over the end windings in the vicinity of the end-turns. The cap is generally U- or C-shaped in cross-section. The motor may further include a cover placed over the compliant cap defining a channel between the rigid cover and the compliant cap, a plurality of orifices defined in the rigid cover and fluidly coupled to the coolant channel, and a supply duct coupled to at least one of the orifices adapted to provide coolant under pressure to the channel. In one embodiment, the coolant is a hydrocarbon lubricant. Alternatively, the coolant is a water/ethylene glycol mixture. The physically-compliant, thermally conductive cap may seal to the cover and/or the end windings loosely to allow coolant to seep and fill gaps between the conductive cap and the end windings.

A method for providing cooling to a motor with a hollow cylindrical stator having longitudinal projections extending from a surface of the stator with slots defined between the projections, with a plurality of wire windings disposed in the slots, and end windings proximate ends of the slots is disclosed. The method includes inserting a rotor inside the stator and fitting a physically-compliant, thermally conductive cap over the windings in the vicinity of the end-turns after inserting the rotor into the stator. The method may further include attaching a rigid cover over the compliant cap wherein a channel is defined between the rigid cover and the compliant cap. In some embodiments, the rigid cover has a coolant supply orifice and a coolant return orifice, the method further includes coupling a supply tube to the coolant supply orifice and coupling a return tube to the coolant return orifice.

An electric motor includes: a cylindrical stator having longitudinal projections extending from a surface of the stator with slots defined between the projections, a plurality of wire windings disposed in the slots, end windings proximate both ends of the stator, and a physically-compliant, thermally conductive cap placed over the end windings. The motors may also include: a rigid cover placed over the compliant cap defining a coolant channel between the rigid cover and the compliant cap, a plurality of orifices defined in the rigid cover and fluidly coupled to the coolant channel, a supply tube coupled to at least one of the orifices adapted to provide coolant under pressure to the channel, and a return tube coupled to at least one of the orifices adapted to conduct coolant out of the coolant channel. In one embodiment, at least one of the orifices provides an exit for the coolant from the coolant channel. The compliant cap made of one or more of a fluoroelastomer, a silicone elastomer, an ethylene acrylate, a nitrile, a polyacrylate, or any suitable material. In some embodiments, the compliant cap material has fibers embedded in a compliant polymer matrix and the fibers are arranged to be roughly continuous from an inner surface placed over the windings to an outer surface. Alternatively, the compliant cap is comprised of a densely woven fibrous jacket. In one embodiment, the compliant cap is porous to allow coolant seepage toward the end windings.

The motor is: a conventional motor with the stator surrounding a rotor and the longitudinal projections extend inwardly toward the rotor, an inside-out motor in which a rotor surrounds the stator and the longitudinal projections extend outwardly toward the rotor, an axial flux motor in which the rotor and stator are generally disk shaped, or any other suitable electric motor.

Advantages according to embodiments of the present disclosure may include greater and more uniform cooling of the end windings and thus greater motor performance and/or extended life of the motor.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
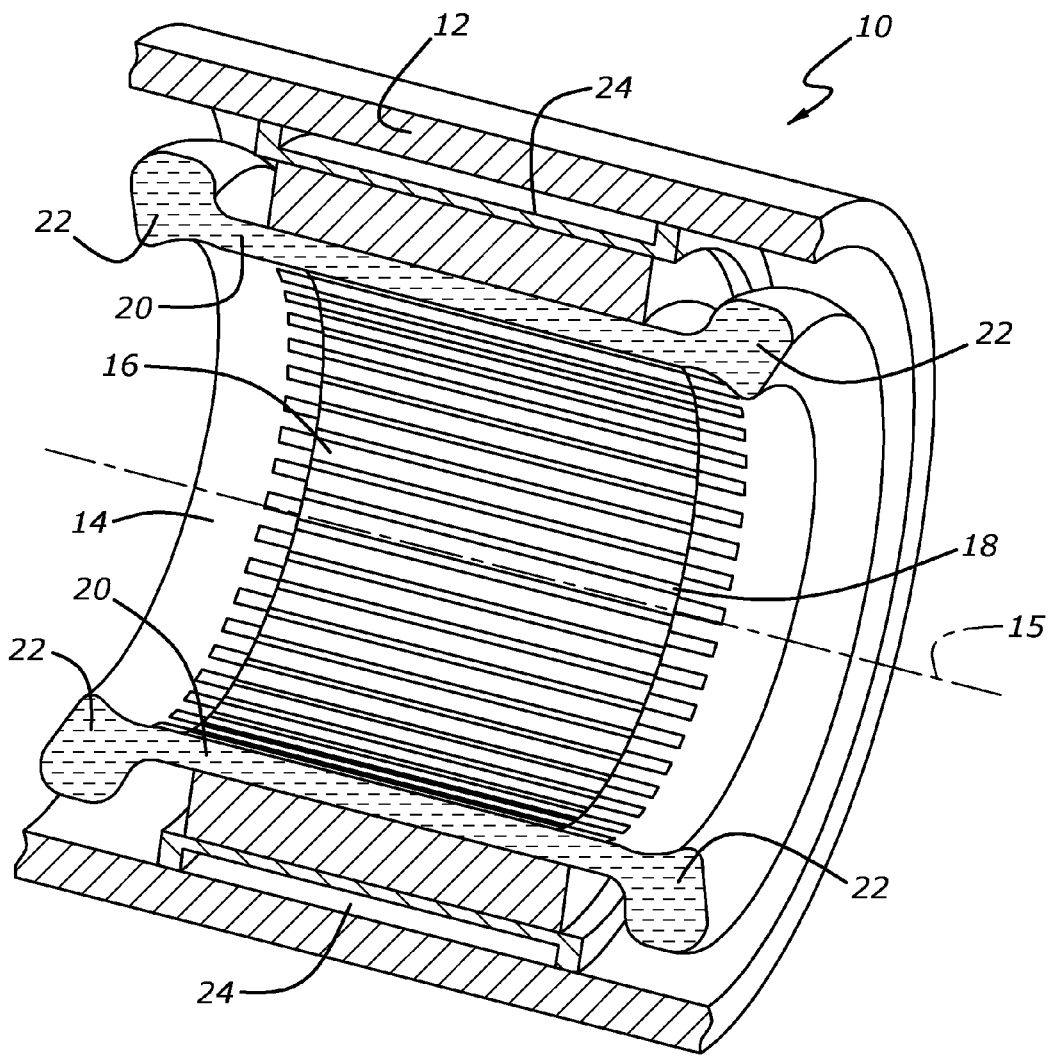
FIG. 1 is a portion of a cutaway of a portion on an electric motor.

In FIG. 1, a cutaway of a portion of an electric motor 10 is shown. A housing 12 houses a stator 14, which is roughly shaped as a hollow cylinder. The stator has a plurality of laminated projections 16. The long dimension of projections 16 run parallel to the central axis 15 of stator 14 and extend inwardly toward the axis of stator 14. Between projections 16 are slots 18. Wire windings 20 (not shown individually) are placed into slots 18. The wire windings, per circuit or phase, are a continuous wire that is placed into one slot and near the end of the slot, turn through 180 degrees, then running along another slot. Multiple windings are provided in each slot. At each end, winding ends 22 are greater in cross section than the parallel wires running in slots 18. The cross sectional view of windings 20 is in the shape of a dumbbell. The windings in slots 18 can be cooled by a water jacket 24 provided between housing 12 and stator 14. However, this does not provide any cooling for winding ends 22. Not shown in FIG. 1 is a rotor, which is placed in stator 14. A coolant may be provided in passages in the rotor. In one background embodiment, orifices are provided in the rotor which are directed toward winding ends 22 to provide cooling. However, as the spray comes from the center, only the inner side of the winding ends is cooled.

Figure 2:
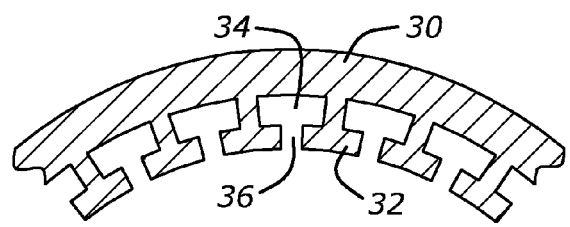
FIGS. 2 and 3 are portions of a cross section of a portion of the stator.
Figure 3:
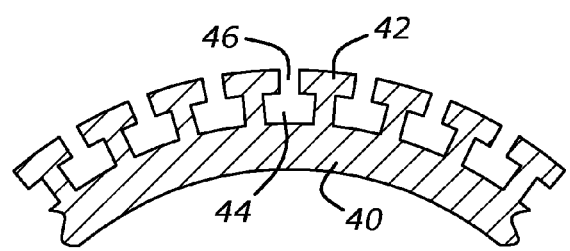

In FIG. 2, a cross section of a portion of a stator is shown. Tee-shaped projections 32 extend inwardly defining slots 34. Windings are placed in slots 34 through openings 36. Conventionally, motors have a central rotor with an outer rotor, such as described in reference to FIG. 1. Alternatively, a less-commonly used "inside-out" motor has a central stator with a rotor being providing outside the rotor. In FIG. 3, a cross section of a portion of such an internal stator 40 is shown with tee-shaped projections 42 extending outwardly and defining slots 44. Wires gain access to slots 44 via opening 46. Other motor topologies, such as axial flux motors, where the stator and rotor are arranged as disks, exist and also have end windings where additional, uniformly-distributed cooling may also be desirable.

Figure 4:
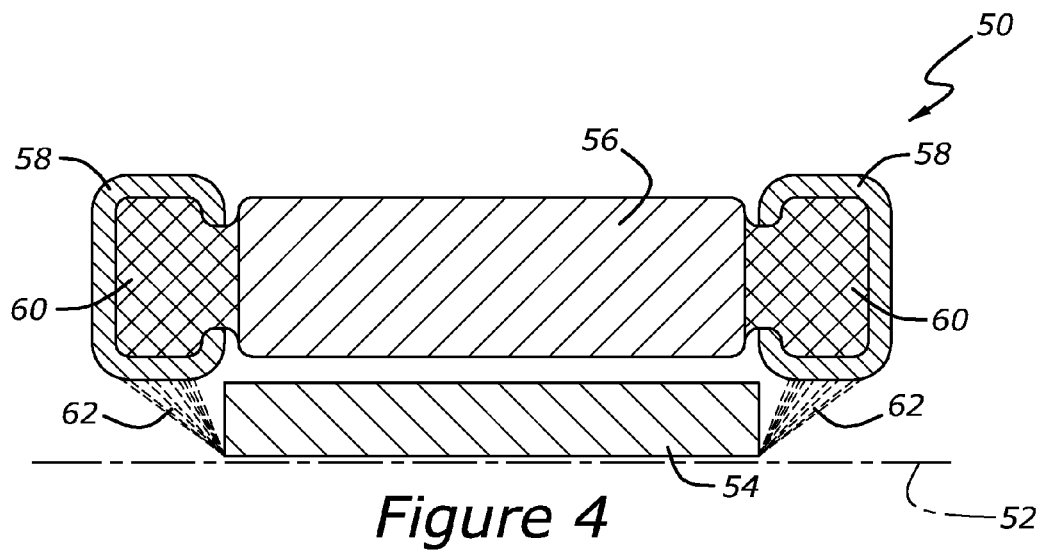
FIGS. 4 and 5 are representations of an upper half of a cross section of a motor according to embodiments of the disclosure.

In FIG. 4, a cross section of the upper portion of a motor 50 according to an embodiment of the disclosure is shown. The axis 52 of motor 50 is coincident with the axis of rotor 54. A stator 56 is displaced outwardly from axis 52. A physically-compliant, thermally conductive cap 58 is formed or fit over end windings 60. Because cap 58 is compliant, the uneven surface presented by the multiple wires leaves very little gap area between cap 58 and end windings 60. Also, because cap 58 is thermally conductive, if a spray 62 is directed toward a portion of the outer surface of cap 58, the temperature distribution in end windings 60 is more uniform than without cap 58.

Figure 5:
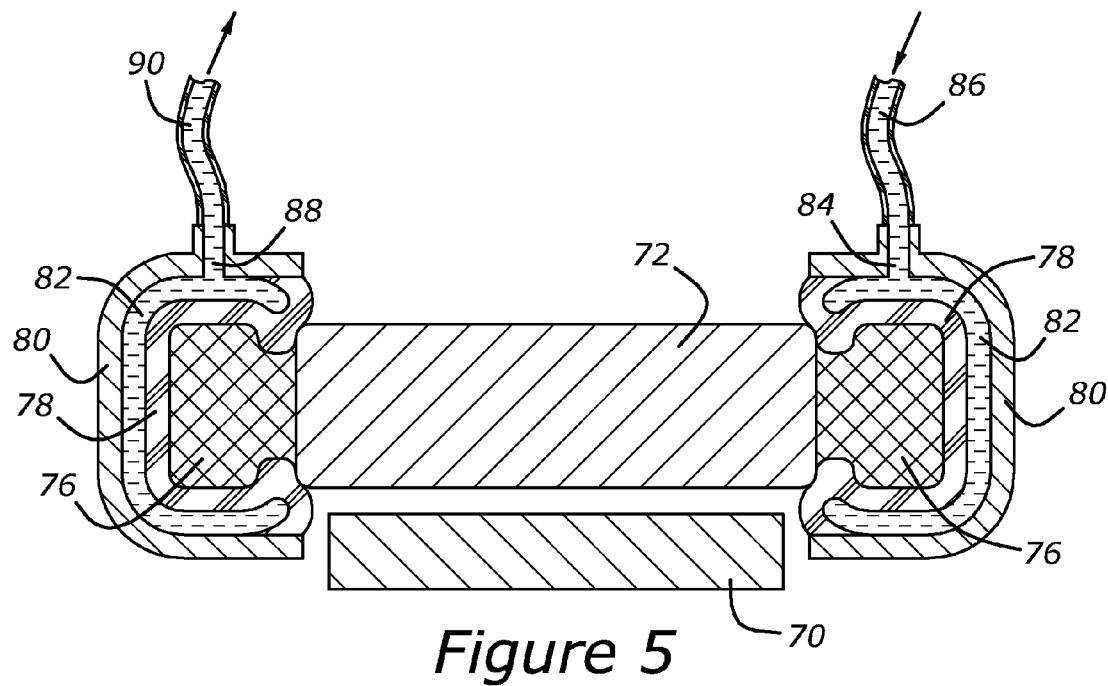

In FIG. 5, an alternative embodiment of a motor has a rotor 70 and a stator 72. Stator 72 has end windings 76 provided with a compliant cap 78. A cover 80 is placed over compliant cap with a channel or a coolant jacket 82 formed between cap 78 and cover 80. Cover 80 has orifices 84 and 88 for allowing flow to and from coolant jacket 82. Coolant is supplied through a supply tube 86 and coolant is removed out a return tube 90. The embodiment in FIG. 5 is just one example. Multiple supply and return tubes may be provided. In another alternative, the exit orifice(s) are made of a particular size to provide a desired pressure drop allowing flow to trickle out of the coolant jacket dumping into a sump and then picked up by a pump. In one embodiment, the coolant is a lubricating oil such as transmission fluid. In another embodiment, engine coolant (water and ethylene glycol) is used as the coolant.

In one embodiment, the cap does not completely seal. Fluid droplets in the cap may then be transported from within the cap to the motor. Such migration of fluid from inside the cap onto the end windings may be desirable to fill any gaps remaining between the cap and the end windings, further increasing thermal conductivity and heat transfer. In another embodiment, the cap is a mesh material that has small openings. Alternatively, small openings are purposely provided to allow coolant to move through the cap and into any air gaps between the cap and the end windings.

A non-exhaustive list of potential materials for the physically-compliant, thermally conductive cap is provided in the following table:

| Material | Max service temperature |
| --- | --- |
| Fluoroelastomers | ~240° C. |
| Silicone elastomers | ~200-280 C. |
| Ethylene acrylates | ~150-160° C. |
| Highly saturated/hydrogenated nitrile | ~150° C. |
| Nitrile | ~135° C. |
| Woven fibrous jacket | Depends on fabric |
| Woven fibrous jacket with an elastomeric coating | Depends on fabric and coating properties |

Figure 6:
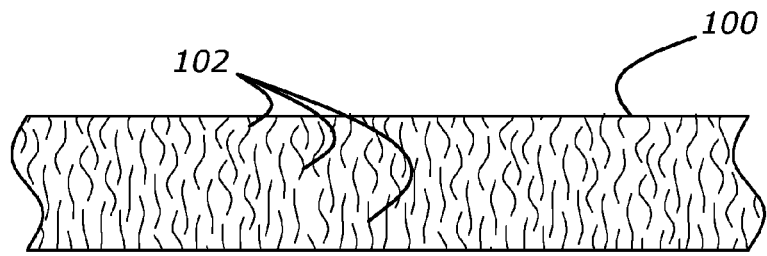
FIG. 6 is a cross-section of a portion of a compliant material including fibers.

In another alternative, a material with aligned carbonaceous fibers is provided in a polymeric matrix such as shown in FIG. 6. A cross-section of a portion of the cap 100 is shown in FIG. 6. Carbonaceous fibers 102 are generally aligned in the polymeric base material to improve thermal conductivity in the direction indicated by the double headed arrow.

According to one embodiment, the motor can be assembled by placing the rotor within the stator prior to placing the compliant cap over the end windings. In embodiments with a cover, the cover is installed with the compliant cap. A supply duct is coupled to a supply orifice in a coolant jacket defined between the compliant cap and the cover. A return tube is coupled to another orifice on the cover in embodiments in which a return path is provided.

Figure 7:
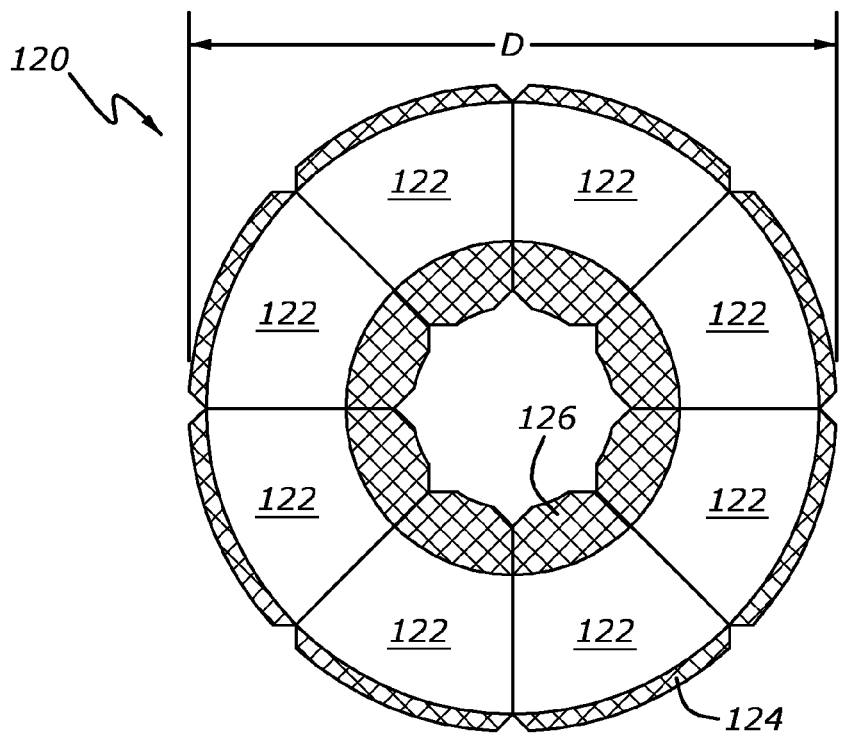
FIG. 7 is a view of a face of a stator of an axial motor.
Figure 8:
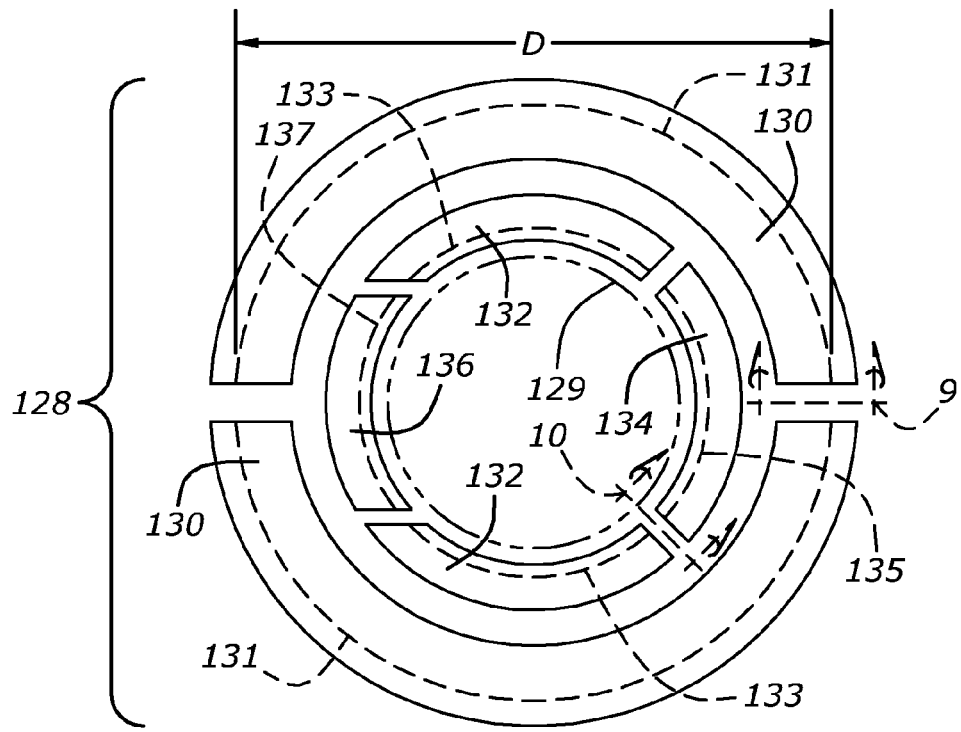
FIG. 8 is a view of a set of sections of coolant caps for a motor according to embodiments of the disclosure.

In FIG. 7, a face of a stator 120 of an axial motor is shown that has multiple stator segments 122 having inner end windings 126 and outer end windings 124. A cover assembly that can be installed over the end windings is shown in FIG. 8. The opening of generally U-shaped segments 130 faces the center. The bottom of the U is shown as hidden line 131. This bottom surface 131 rests against the periphery of stator 120 covering outer end windings 124. The inner end windings 126 present more of a challenge to cover. One example of multiple segments is shown in FIG. 8. Cover segments 132 and 134 can be put onto end windings 126 one at a time by placing them into the opening and sliding the over end windings 126. Cover segments 132 and 134 are generally U-shaped, but with the opening of the U facing outwardly. The bottom of the U is shown as hidden lines 133 and 135 for cover segments 132 and 134, respectively. Cover segment 136 has ends that are parallel with each other so that it can be slid into place when segments 132 and 134 are already installed. Segments 132 have one end that is coincident with a radius of the circle and one end that mates with segment 136. Cross-sectional views 9-9 and 10-10 are noted in FIG. 8.

Figure 9:
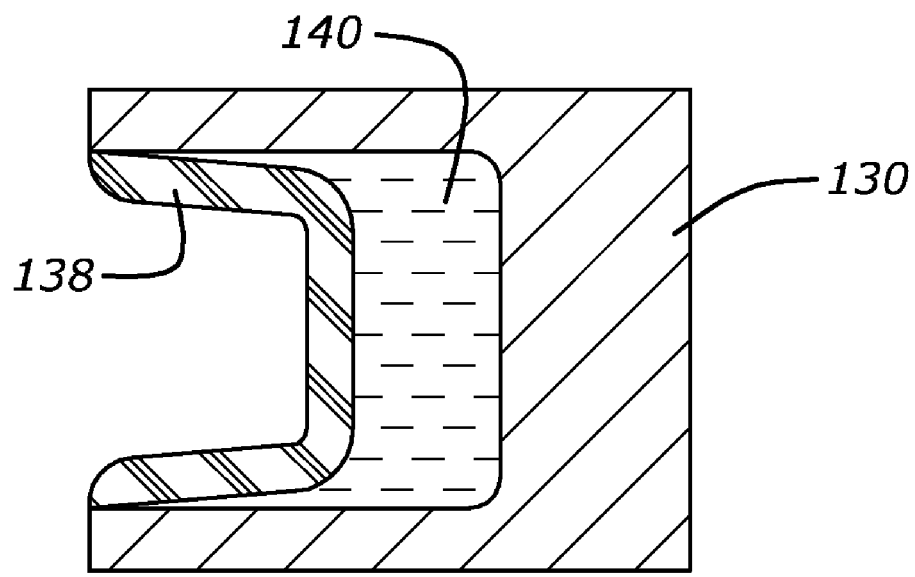
FIGS. 9 and 10 are representations of cross sections of a portion of coolant caps for a motor according to embodiments of the disclosure.
Figure 10:
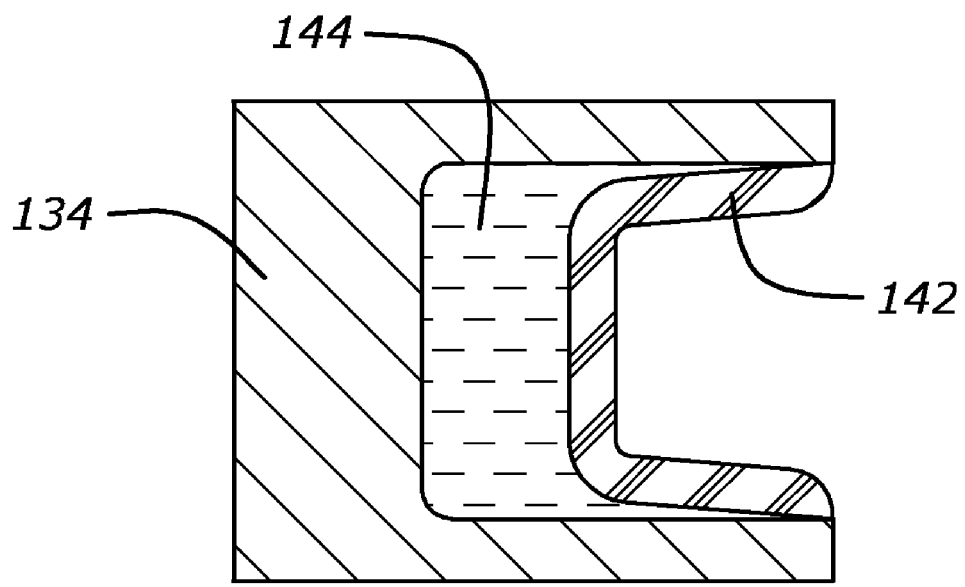

In FIG. 8, only the cover segments are shown. In FIG. 9, showing the cross-sectional view, cover segment 130 may have a flexible cap 138 and a passage 140 through which coolant can be circulated. Similarly, cover segment 134, as well as the other segments, may have a flexible cap 142 and a passage 144 through which coolant can be circulated. Depending on the material out of which the caps are formed, it may be possible to have a single cap cover the inner end windings and a single cap cover the outer end windings, i.e., segmentation may be obviated. In FIGS. 9 and 10, passages 140, 144 are formed between the covers 130, 134 and the caps 138, 142, respectively. In an alternative embodiment, a separate passage may be provided between the cap and cover. In one example, the passage is of a flexible material and can fill up the spaces shown in FIGS. 9 and 10 as elements 140 and 144.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: efficiency, direct cost, strength, durability, life cycle cost, packaging, size, weight, serviceability, manufacturability, ease of assembly, marketability, appearance, etc. The embodiments described as being less desirable relative to other embodiments with respect to one or more characteristics are not outside the scope of the disclosure as claimed.

What is claimed:

1. An electric motor, comprising:
   a motor housing;
   a stator within the housing and having a plurality of slots defined therein;
   a plurality of wire windings disposed in the slots and forming end windings;
   a physically-compliant, thermally conductive cap placed over the end windings; and
   a rigid cover bonded to the cap and spaced from the cap to define a coolant channel between the cover and the cap.

2. The motor of claim 1, further comprising:
   a plurality of orifices defined in the rigid cover and fluidly coupled to the coolant channel; and
   a supply duct coupled to at least one of the orifices and providing coolant under pressure to the channel.

3. The motor of claim 2 wherein the coolant is substantially comprised of a hydrocarbon lubricant.

4. The motor of claim 2 wherein the coolant is substantially comprised of a water and ethylene glycol mixture.

5. The motor of claim 1 wherein the cap is porous to allow coolant to seep through the cap and fill gaps between the cap and the end windings.

6. An electric motor, comprising:
   a housing;
   a stator retained within the housing and having longitudinal projections extending from a surface of the stator with slots defined between the projections;
   a plurality of wire windings disposed in the slots to form end windings proximate both ends of the stator;
   a physically-compliant, thermally conductive cap placed over the end windings; and
   a rigid cover bonded to the cap to form a coolant channel between the cover and the cap.

7. The motor of claim 6, further comprising:
   a plurality of orifices defined in the rigid cover and fluidly coupled to the coolant channel; and
   a supply tube coupled to at least one of the orifices with the supply tube adapted to provide coolant under pressure to the channel.

8. The motor of claim 7, further comprising:
   a return tube coupled to at least one of the orifices adapted to conduct coolant out of the coolant channel.

9. The motor of claim 7 wherein at least one of the orifices provides an exit for the coolant from the coolant channel.

10. The motor of claim 6 wherein the compliant cap is comprised of one of: a fluoroelastomer, a silicone elastomer, an ethylene acrylate, a nitrile, and a polyacrylate.

11. The motor of claim 6 wherein the compliant cap material has fibers embedded in a compliant polymer matrix and the fibers are arranged to be roughly continuous from an inner surface placed over the windings to an outer surface.

12. The motor of claim 6 wherein the compliant cap is comprised of a densely woven fibrous jacket.

13. The motor of claim 6 wherein the motor is one of:
   a conventional motor with the stator of a generally hollow cylindrical shape surrounding a rotor and the longitudinal projections extend inwardly toward the rotor;
   an inside-out motor in which a rotor surrounds the cylindrical stator and the longitudinal projections extend outwardly toward the rotor; and
   an axial flux motor in which the rotor and stator are generally disk shaped.

14. The motor of claim 6 wherein the compliant cap is porous to allow coolant seepage toward the end windings.

* * * * *